(12) United States Patent
Genolet et al.

(10) Patent No.: US 8,226,879 B2
(45) Date of Patent: Jul. 24, 2012

(54) HYPER-FINE CEMENT

(75) Inventors: Luis Genolet, Saarbruecken (DE); Helmut Schmidt, Saarbruecken-Guedingen (DE)

(73) Assignee: EPG (Engineered Nanoproducts Germany) AG, Griesheim (DE)

( * ) Notice: Subject to any disclaimer, the term of this patent is extended or adjusted under 35 U.S.C. 154(b) by 0 days.

(21) Appl. No.: 12/676,506

(22) PCT Filed: Sep. 5, 2008

(86) PCT No.: PCT/EP2008/061791
§ 371 (c)(1),
(2), (4) Date: Apr. 16, 2010

(87) PCT Pub. No.: WO2009/030758
PCT Pub. Date: Mar. 12, 2009

(65) Prior Publication Data
US 2010/0193982 A1   Aug. 5, 2010

(30) Foreign Application Priority Data
Sep. 5, 2007 (DE) .......................... 10 2007 042 078

(51) Int. Cl.
C04B 35/00 (2006.01)
(52) U.S. Cl. .......... 264/426; 264/15; 264/36.2; 264/344
(58) Field of Classification Search ............... 264/15, 264/36.2, 344, 426; 106/713, 739, 748
See application file for complete search history.

(56) References Cited

U.S. PATENT DOCUMENTS

| | | | |
|---|---|---|---|
| 3,689,294 A * | 9/1972 | Braunauer | 106/809 |
| 5,086,850 A | 2/1992 | Harris et al. | |
| 5,125,976 A * | 6/1992 | Skvara et al. | 106/724 |
| 5,417,760 A | 5/1995 | Folsberg | |
| 5,429,675 A * | 7/1995 | Cheung et al. | 106/802 |
| 5,510,118 A * | 4/1996 | Bosch et al. | 424/489 |
| 5,776,244 A | 7/1998 | Ahrens | |
| 5,799,882 A * | 9/1998 | Klimpel | 241/16 |
| 2002/0047058 A1* | 4/2002 | Verhoff et al. | 241/26 |
| 2002/0119200 A1* | 8/2002 | Haskell | 424/489 |
| 2004/0112255 A1 | 6/2004 | Bruno et al. | |

(Continued)

FOREIGN PATENT DOCUMENTS
DE       36 27 283 A1    2/1988
(Continued)

OTHER PUBLICATIONS
English machiine translation of DE 3627283, retrieved from EPO Mar. 10, 2011.*

(Continued)

Primary Examiner — Joseph Del Sole
Assistant Examiner — Timothy Kennedy
(74) Attorney, Agent, or Firm — Abel Law Group, LLP

(57) ABSTRACT

The invention relates to a process for producing a hyper-fine cement, in which cement is wet milled in a nonaqueous solvent, if appropriate in the presence of a grinding aid, as a result of which a hyper-fine cement having a particle size $D_{50}$ of <1 μm is obtained.

The hyper-fine cement is suitable for sealing or strengthening porous molded articles, rock or porous formations, in particular for the gastight sealing of natural gas reservoirs and also for making polymer materials or components composed of pressed textiles or natural fibers fire resistant.

20 Claims, 1 Drawing Sheet

U.S. PATENT DOCUMENTS

2004/0206272 A1* 10/2004 Hermansson et al. .......... 106/35
2007/0186818 A1*  8/2007 Bohner .................... 106/691

FOREIGN PATENT DOCUMENTS

| | | |
|---|---|---|
| DE | 37 22 652 A1 | 1/1989 |
| EP | 1 236 701 A1 | 9/2002 |
| GB | 470365 | 8/1937 |
| JP | 10-231515 A | 9/1998 |
| JP | 2003-137630 A | 5/2003 |
| WO | 90/14322 A1 | 11/1990 |
| WO | 2008/106461 A1 | 9/2008 |

OTHER PUBLICATIONS

Armando Garcia-Luna et al.,"High strength micro/nano fine cement", 2$^{nd}$ International Symposium on Nanotechnology in Construction, Jan. 1, 2006, pp. 285-291.

Bath F.,"Planeten-Kugelmuhlen fur die Herstellung von Nanopartikeln", Chemie Ingenieur Technik 2005,77(9), pp. 1276-1278.

English language abstract of JP 2003-137630 A.

English language abstract of JP 10-231515 A.

English language abstract of DE 37 22 652 A1.

English language abstract of DE 36 27 283 Al.

Naudts, A., Landry E. "New On-site Wet Milling Technology for the Preparation of Ultrafine Cement-based Grouts", 3rd International Speciality Conference on Grouting and Ground Treatment, Feb. 10-12, 2003, New Orleans, Louisiana, USA, pp. 1-7.

Clarke, W., "Performance characteristics of microfine cement", ASCE preprint 84-023, Atlanta, Georgia, American Society of Civil Engineers, New York, May 14-18, 1984.

Naudts, A., Landry E., Hooey, S., Naudts, W., "Additives and Admixtures in Cement-based Grouts", 3rd International Speciality Conference on Grouting and Ground Treatment, Feb. 10-12, 2003, New Orleans, Louisiana, USA, pp. 1-12.

* cited by examiner

HYPER-FINE CEMENT

BACKGROUND OF THE INVENTION

1. Field of the Invention

The present invention relates to a hyper-fine cement, in particular a hyper-fine cement having a particle size $D_{50}$ below 1 μm, and also a process for producing this hyper-fine cement and its use.

2. Discussion of Background Information

Cements such as portland cements are usually produced from natural raw materials by means of a firing process. This forms clinkers. Milling of the clinkers in a dry milling process gives a fine powder, namely the cement. Clinkers have to be milled dry since otherwise the cement formed will set and become unusable. Cements are hydraulic. This means that when mixed with water they set to give a compact moulded article; in this process, the important building block of clinkers, namely monocalcium silicate, forms tricalcium silicate which crystallizes in fine needles which intermesh and thus bring about the strength of the cement block.

Cement mortars are aqueous mixtures of milled cement with sand. Concretes are aqueous mixtures of milled cement with relatively coarse gravel.

The particle size of the milled clinkers is usually above 10 μm. Since the particle size is relatively non-uniform, it is usual to indicate the percentages which are below a particular size. A measure of the fineness which has become established in the cement industry is the Blaine value. Here, a particular amount of air is pumped through a standardized bed of milled cement and the time required for this is measured. The finer the particles, the longer the time required. Another value is the $D_{50}$. It indicates the percent by weight of the particles smaller than a given diameter. The finer the clinkers are milled, the greater the strength of the mortar or concrete generally becomes.

In the milling of cement, it is essential that the cement is milled dry, i.e. in the absence of water. Dry milling processes have a distinct lower limit to the particle size which can be achieved, since in the dry state the recombination rate of the particles is significantly higher than, for example, in wet milling processes since charges are formed on the surfaces which have been broken apart and quickly rejoin the particles.

Commercial portland cement has an average particle size distribution having a $D_{50}$ in the order of 70 μm. Cements having a $D_{50}$ of 10 μm or somewhat below are referred to as ultrafine cements; commercial ultrafine cements have a $D_{50}$ in the range from 3 to 8 μm, see FIG. 1. They are obtained from normal cements by separating off the coarser fractions by means of various separation processes.

Ultrafine cements are used, in particular, as additives to coarser mixtures in the petroleum and natural gas industry. Thus, for example, mortar based on ultrafine cement has gained increasing importance in recent years in rock and soil injections for strengthening or sealing. For use of ultrafine cements in the oil and gas industry, these grades should have an excellent penetration capability and excellent strength and keeping qualities so that they can be used for the pressure cementing of oil well matrices or formations, in particular for the control of gas and water (GOR (gas-oil ratio) and WOR (water-oil ratio)).

To produce ultrafine cements, it is usual to employ dry milling since this can be carried out simply and quickly but it requires careful matching of the milling conditions to the respective sample. Apart from dry milling processes, wet milling processes using water are also known, as described, for example, by Naudts, A., Landry E. "New On-site Wet Milling for the preparation of Ultrafine Cement-based Grouts", 3rd International Specialty Conference on Grouting and Ground Treatment, 10-12 Feb. 2003, New Orleans, La., USA. However, such wet milling using water is only possible if the ultrafine cement is produced on site in situ immediately before injection or treatment, before it becomes hard.

Other processes for producing ultrafine cement are a process in which ultrafine additives having finer particles are added to the cement (Clarke, B., "Performance characteristics of microfine cement", ASCE preprint 84-023, Atlanta, Ga., American Society of Civil Engineers, New York) and a process in which fine by-products from normal cement production stages are collected (U.S. Pat. No. 5,417,760). As additives which improve some mixing properties and reduce the Blaine value of the cement, slag, fine silica and fly ash are mentioned by Naudts, A., Landry E., Hooey, S., Naudts, W., "Additives and Admixtures in Cement-based Grouts", 3rd International Specialty Conference on Grouting and Ground Treatment, 10-12 Feb. 2003, New Orleans, La., USA.

Ultrafine cements serve to strengthen or seal loose or porous rock; penetration of the cement made up with water into relatively small pores should also be achieved. However, since many rocks have pores in the lower micron range or even below 1 μm, the process cannot be used in such cases and is therefore very limited overall. In the exploitation of natural gas reservoirs, in particular, this is serious because gas can very easily escape from the rock through even very fine pores and very high losses therefore occur in many natural gas wells.

The object was to provide a process for sealing or strengthening porous moulded articles, rock or porous formations, by means of which even very fine pores of rock can be sealed so that even natural gas under pressure cannot escape. In particular, a cement which can be pumped into even very fine pores of rock and hardens there should be provided.

The object has surprisingly been able to be achieved by a process for producing a hyper-fine cement having a particle size $D_{50}$ of <1 μm, which comprises the wet milling of cement or cement clinker in a nonaqueous solvent. Since the cement having a $D_{50}$ below 1 micron which is obtained by the process of the invention can penetrate into even very fine pores, it is of extraordinarily high importance for the sealing of rock, in particular in the case of natural gas wells. The invention is described in detail below.

SUMMARY OF THE INVENTION

The present invention provides a process for producing a hyper-fine cement. The process comprises the wet milling of cement and/or cement clinker in a non-aqueous solvent to obtain a hyper-fine cement having a particle size $D_{50}$ of <1 μM.

In one aspect, the process may be carried out in the presence of a grinding aid. For example, the grinding aid may comprise triethanolamine.

In another aspect, the process may further comprise an at least partial separation of the non-aqueous solvent from the hyper-fine cement that is obtained after milling. For example, the non-aqueous solvent may be separated by at least one of filtration, centrifugation, decantation, and distillation.

In yet another aspect, the process may further comprise the drying of moist hyper-fine cement which remains after milling and, optionally, partial removal of other components to obtain a free-flowing powder.

In a still further aspect of the process, the cement or cement clinker may be milled in a ball mill and/or a rotational ball mill.

In another aspect, the non-aqueous solvent may comprise isopropanol.

In another aspect, the process may further comprise a mixing of the hyper-fine cement in dry form with water to form a low-viscosity slurry.

In another aspect, the cement may comprise portland cement.

The present invention also provides a hyper-fine cement which has a particle size $D_{50}$ of <1 µm. The hyper-fine cement may have been obtained by the process of the present invention as set forth above, including the various aspects thereof.

In one aspect, the cement may additionally comprise at least one cement additive selected from retarders and diffusion blockers.

The present invention also provides a process for sealing or strengthening porous molded articles, rock or porous formations, which process comprises using the hyper-fine cement of the present invention as set forth above as a sealing and/or strengthening agent.

In one aspect of this process, the sealing may be carried out in oilfields or natural gas fields, in particular in porous rock in natural gas reservoirs.

In another aspect, the process may comprise pumping or infiltrating a slurry which comprises the cement and water into the porous molded articles, rock or porous formations.

The present invention also provides a process for improving the fire resistance of polymer materials or components composed of pressed textiles or natural fibers. The process comprises combining the materials or components with the hyper-fine cement of the present invention as set forth above in an amount which is sufficient to improve the fire resistance thereof.

The present invention also provides a process for at least one of repairing damaged masonry by injection, forming fiber-reinforced cement components by infiltration, strengthening loose earth, strengthening building plaster or render, constructions and walls, sealing or renovating masonry or restoring buildings, producing components by infiltration of powder, e.g. composed of sand, gravel, polymers, metal or mixtures thereof, and sealing landfills. The process comprises using the hyper-fine cement of the present invention as set forth above.

DETAILED DESCRIPTION OF THE INVENTION

Figure 1:
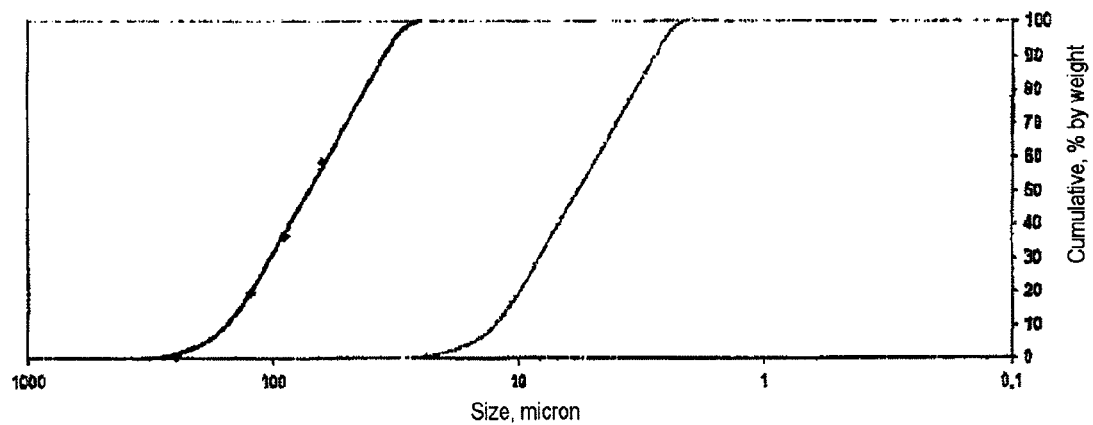
FIG. 1 shows the particle size distribution of a conventional portland cement (bold line, grade EN 197-1 I CEM II/B-S 32.5 R) and a conventional ultrafine cement (thin line).

The particle size is reported as $D_{50}$ (particle size $D_{50}$) in this description. This size parameter is customary in the cement field. The particle size $D_{50}$ indicates the number of percent by weight of the sample consisting of particles having a size below the diameter indicated. A particle size $D_{50}$ of less than 1 µm therefore means that 50% by weight of the sample consists of particles having a diameter of less than 1 µm. Analogously, a $D_{95}$ indicates that 95% by weight of the sample have a particle size below the length indicated.

Depending on the particle size, the particle size distribution is for this purpose determined by various measurement methods: up to 20-40 µm: sieve analyses; below 10 µm: optical counting methods, electric counting methods, sedimentation techniques; below 1 µm: laser light scattering methods. In the case of the ultrafine cements of the invention such as those obtained in the examples, the $D_{50}$ can be determined by optical measurement under the microscope, but determination by laser light scattering is more precise.

As cement starting material to be milled, it is possible to use any commercial cement or cement clinker, with the use of cement being preferred. It is possible to use all known grades of cement clinker and cement, for example and without restriction, portland cement clinker, portland cement, slag cement, pozzolanic cement, high-alumina cement, asbestos cement and expanding cement, with portland cements being preferred. It can be advantageous to use a cement having a relatively small particle size as starting material, for example to minimize the energy input required for the hyper-fine milling according to the invention, but it is equally possible to begin with coarser cement grades or cement clinker. When cement clinker is used, a multistage process with coarse comminution and fine comminution is generally useful, with coarse comminution also being able to be carried out by dry milling.

The invention is based on the surprising discovery that conventional cement, preferably portland cement, can be milled to significantly smaller particle sizes in a liquid phase than is possible in dry milling. However, this was achieved not in aqueous phases but in nonaqueous solvents. Accordingly, the process of the invention comprises the wet milling of cement or cement clinker in a nonaqueous solvent.

As solvent, it is possible to use virtually all customary organic solvents or mixtures of two or more organic solvents. The solvent should by substantially free of water or have a very low water content. Depending on the solvent, it is often usual for small amounts of water to be present, for instance as impurity, which generally does not interfere in the process, so that complicated purification processes are not necessary. The water content of the solvent should not exceed 10% by weight, preferably 5% by weight, e.g. it can be in the range from 5 to 1% by weight or from 2.5 to 1% by weight without the process being adversely affected. Solvents containing less than 1% by weight of water or no water at all are naturally at least equally suitable. Examples of solvents which can be used are aliphatic and alicyclic hydrocarbons such as pentane, hexane and cyclohexane, aromatics such as toluene, halogenated hydrocarbons such as methylene chloride, chloroform, carbon tetrachloride and ethylene chloride, alcohols such as methanol, ethanol, n-propanol, isopropanol, butanols, hexanols and cyclohexanol, ketones such as acetone and butanone, esters such as ethyl acetate and butyl acetate, linear and cyclic ethers such as diethyl ether, dibutyl ether, dioxane and tetrahydrofuran, amides and other nitrogen compounds such as acetonitrile, dimethylformamide and pyridine. Preference is given to using polar solvents, in particular alcohols, with isopropanol being particularly preferred.

Preference is given to adding one or more additional grinding aids to the mixture of cement clinker or cement and nonaqueous solvent to be milled. The presence of a grinding aid in the milling process can additionally improve the comminution of the cement particles, e.g. by a smaller energy input being necessary, the duration of the milling process being able to be shortened and/or even smaller particle sizes being possible. The use of grinding aids is known in the cement industry and it is possible to use all grinding aids known for the milling of cement. Such grinding aids are, for example, listed in cement handbooks.

The use of triethanolamine has been found to be particularly advantageous. Triethanolamine is soluble in polar solvents such as alcohols. The grinding aid is preferably soluble in the organic solvent used.

Grinding aids are generally polar molecules which may have ionic character. Without wishing to be bound by a theory, it is assumed that these grinding aids quickly become attached to the charged surfaces when a particle breaks apart and thus prevent recombination. In the dry state, diffusion of the molecules of the grinding aids to the respective fracture surfaces is very difficult. The effect of grinding aids is therefore restricted in the dry state; this can be seen without difficulty from the limitations of dry milling of the clinker. In the organic solvents used according to the invention, on the other hand, the grinding aids are particularly effective.

Examples of grinding aids used in the cement industry are glycols such as ethylene glycol and propylene glycol, amines and their salts, e.g. triethanolamine and its salts, alcohols, hydroxycarboxylic acids, lignosulphonates, fatty acids and their salts and also dry soap/detergent as lubricant and graphite as antistatic and lubricant, with triethanolamine being particularly preferred. A particularly advantageous combination is therefore isopropanol as solvent and triethanolamine as grinding aid.

The mixing ratios of the three components used in the mixture can vary within a wide range and depend, inter alia, on the specific compounds and the milling conditions used. If a grinding aid is used, the weight ratio of grinding aid to cement can generally be, for example, in the range from 0.01 to 1.5, preferably in the range from 0.1 to 0.2. The weight ratio of solvent to cement can also vary within a wide range. An amount of solvent which makes wet milling possible is sufficient, but the amount of solvent can be increased virtually at will. The weight ratio of solvent to cement can, for example, advantageously be in the range from 0.05 to 5 and preferably in the range from 0.3 to 1.0.

The milling process can be carried out using customary apparatuses or comminution machines by means of which powder can be milled in a wet milling process. Examples are mills having loose milling media such as balls, rods or cylinders, e.g. ball, rod, planetary and vibratory mills, homogenizers, turbostirrers, rotary ball mills, stirred ball mills, roll mills and colloid mills such as disc mills. Preference is given to ball mills, with the balls being able to have, for example, a size in the range from 1 to 50 mm. The balls can be, for example, made of zirconia. However, it is naturally also possible to use milling media having a different shape. Rotational ball mills having a rotor and stator are also suitable.

In this way it was possible, for example, to mill a conventional portland cement down to a $D_{50}$ of significantly below one micron in a ball mill from Retsch in isopropanol with triethanolamine as grinding aid within 120 minutes.

The wet milling process gives a paste, dispersion or slurry of hyper-fine cement having a particle size $D_{50}$ of less than 1 μm in the nonaqueous solvent. If a grinding aid was used, this is likewise present in the paste, dispersion or slurry. If it is soluble in the solvent, it can be separated off at least partly from the resulting hyper-fine cement relatively easily, if this is desired.

In general, the solvent and, if used, the grinding aid are at least partly separated off again after the milling process. The solvent is usually removed completely in order to obtain a dry powder. This can be effected by any customary known separation process, e.g. by filtration, centrifugation, decantation or distillation. If grinding aid remaining in the cement is also to be removed, this can be effected by means of washing, e.g. with the solvent used in the milling process or else with another organic solvent. If necessary, it is also possible to leave the grinding aid in the cement.

Depending on the separation process, a still moist hyper-fine cement may firstly be obtained, e.g. in the case of filtration or decantation. Such a still moist cement can be converted into a dry, free-flowing powder by drying, if appropriate with heating. The hyper-fine cement obtained has a particle size, determined as the $D_{50}$, of less than 1 μm. In this way, a dry cement powder according to the invention is obtained, e.g. after filtration using a filter having an appropriately small pore size, if appropriate after washing with a solvent such as isopropanol.

The hyper-fine cement having a $D_{50}$ below 1 μm obtained by the process of the invention reacts extraordinarily quickly with water to give a solid moulded article.

If required, customary additives such as accelerators, retarders and diffusion-inhibiting additives (diffusion blockers) can be added to the hyper-fine cement of the invention. These are known in the cement industry and are used as a function of the desired properties of the cement.

With regard to examples of such additives which may be used, reference is made to handbooks of cement technology. Examples of retarders customary in the cement industry are sucrose, phosphonic acid derivatives (PBTC) and tetrapotassium pyrophosphate. Examples of diffusion blockers customary in the cement industry are soluble silicates and silicofluorides, milled slag, pumice, diatomite, fly ash, silica dust, stearic, caprylic and oleic acids or their sodium, ammonium, sulphonium and aluminium salts. The cement can naturally also be used in admixture with sand as mortar.

The setting time can be adjusted within the limits usual in the cement industry by means of retarders customary in the cement industry. To achieve additionally improved sealing, diffusion blockers as are customarily used, for example, in the production of watertight concretes (barrier concrete) in the cement industry can also be added to the cements according to the invention. Such diffusion blockers are, for example, listed in handbooks of the cement industry. These additives are commercially available and are always used in the building industry where, for example, watertight ceilings, walls or floors have to be produced.

The hyper-fine cement of the invention can be mixed in dry form with water to produce a slurry, preferably a low-viscosity slurry. After mixing, very fine pores, even pores smaller than 1 μm, can be filled with slurry. This makes it possible to achieve gastight sealing of porous moulded articles, rock or formations. In a preferred embodiment, customary diffusion blockers are added to the cement of the invention. This combination makes it possible to achieve completely gastight seals in porous rock.

The hyper-fine cement of the present invention can be used for any application for which conventional cement can also be used. The hyper-fine cement of the present invention is particularly suitable for sealing or strengthening porous moulded articles, rock or porous formations, preferably for oilfields and particularly preferably for natural gas fields.

The porous moulded articles can, for example, be made of sand, gravel, metal, plastic or ceramic. Porous formations include geological formations such as rocks or soils, with the porous shaped bodies, formations or rocks also being able to be loose assemblies of discrete components such as sand particles or stones in which the interstices between the discrete components form the pores or channels. The porous moulded article can thus also consist of a not yet consolidated powder. Examples of porous formations are soils and formations composed of sand, earth of sandstone and other mineral formations, in particular all types of boulders or rock.

The sealing or strengthening of porous moulded articles, rock or porous formations is preferably carried out by preparing a mixture of the hyper-fine cement of the invention and water, with additives such as retarders and diffusion blockers and sand being able to be added if required, and pumping or infiltrating the resulting slurry into the porous moulded articles, rock or formations, which can, if appropriate, be aided by application of pressure. The cement slurry which has penetrated into the pores or channels of the moulded articles, rock or formations solidifies after a certain time and thus effects the desired sealing or strengthening.

The hyper-fine cement of the present invention is also suitable as additive for polymers or components composed of pressed textiles or natural fibres in order to improve the fire resistance of these materials.

Further specific applications of the hyper-fine cement of the invention or of a cement slurry, mortar or concrete produced therefrom, if appropriate with addition of the above-mentioned additives, are, for example, the repair of damaged masonry by injection, the formation of fibre-reinforced cement components by infiltration, strengthening of loose earth, strengthening of building plaster or render, constructions and walls, the sealing or renovation of masonry, the restoration of buildings, the production of components by infiltration of powders, e.g. of sand, gravel, polymers, metal or mixtures thereof, and the sealing of landfills.

EXAMPLES

Example 1

40 g of portland cement were mixed with 6 g of triethanolamine as grinding aid. The mixture was then dispersed in 15 g of isopropanol, analytical reagent, as fluid milling medium (wet milling process). The weight ratios of the components were as follows: cement: 65.57%, triethanolamine: 9.84%, isopropanol: 24.59%. The mixture was introduced into a Retsch Cup Mill containing zirconia balls and milled for 2 hours at 500 rpm, alternating cycles, using the following milling conditions:

| | |
|---|---|
| Amount of milling media (balls): | 120 g (corresponds to 3 g/g of cement) |
| Size of milling media (balls): | 3 mm |
| Milling speed (from 110 to 600 rpm): | 500 rpm |
| Milling time | 120 min |

Figure 2:
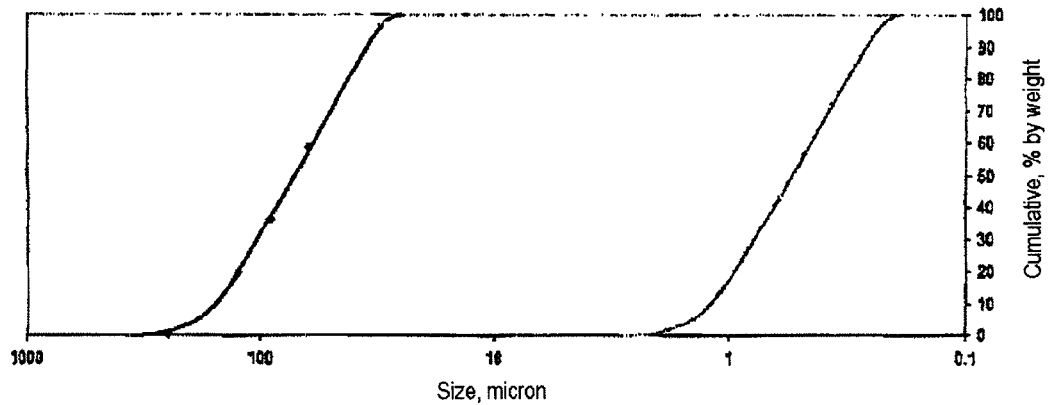
FIG. 2 shows the particle size distribution of the hyper-fine cement produced as described in Example 1 (thin line) in comparison with the portland cement of FIG. 1, which was used as starting material.

After the end of the milling cycle, the balls were separated off by wet sieving using isopropanol, analytical reagent. The hyper-fine cement obtained was dried by evaporation of the alcohol. The particle size distribution and the $D_{50}$ of the hyper-fine cement are shown in FIG. 2.

Example 2

The procedure of Example 1 was repeated except that 1.5 g of milling media/g of cement were used instead of 3 g of milling media/g of cement and balls of various sizes (2 balls of 20 mm, 10 balls of 10 mm, 150 g of balls of 3 mm) were used instead of balls having a size of 3 mm.

The particle size distribution of the hyper-fine cement obtained was as in Example 1. The use of a combination of various sizes for the milling media thus makes it possible to achieve the same results in terms of the particle size distribution at a lower weight ratio of cement to milling media.

What is claimed is:

1. A process for producing a hyper-fine cement, wherein the process comprises wet milling a cement or a cement clinker in a non-aqueous solvent that comprises isopropanol in the presence of a grinding aid that is different from the non-aqueous solvent to obtain a hyper-fine cement having a particle size $D_{50}$ of <1 µm, and at least partly separating the non-aqueous solvent and the grinding aid from the hyper-fine cement obtained after milling, a weight ratio of solvent to cement being from 0.05 to 5, and a weight ratio of grinding aid to cement being from 0.01 to 1.5.

2. The process of claim 1, wherein the non-aqueous solvent is separated by at least one of filtration, centrifugation, decantation, and distillation.

3. The process of claim 1, wherein the process further comprises drying moist hyper-fine cement which remains after milling and partial removal of other components to obtain a free-flowing powder.

4. The process of claim 1, wherein the cement or cement clinker is milled in at least one of a ball mill and a rotational ball mill.

5. The process of claim 1, wherein the grinding aid is selected from one or more of glycols, amines and salts thereof, hydroxycarboxylic acids, lignosulfonates, and fatty acids and salts thereof.

6. The process of claim 1, wherein the grinding aid comprises triethanolamine.

7. The process of claim 1, wherein the process further comprises mixing the hyper-fine cement in dry form with water to form a low-viscosity slurry.

8. The process of claim 1, wherein the cement comprises portland cement.

9. The process of claim 1, wherein a weight ratio of grinding aid to cement is from 0.1 to 0.2.

10. The process of claim 1, wherein a weight ratio of solvent to cement is from 0.3 to 1.0.

11. The process of claim 9, wherein a weight ratio of solvent to cement is from 0.3 to 1.0.

12. A process for producing a hyper-fine cement, wherein the process comprises wet milling of a cement or a cement clinker in a non-aqueous solvent which comprises isopropanol and in the presence of a grinding aid selected from one or more of glycols, amines and salts thereof, hydroxycarboxylic acids, lignosulfonates, and fatty acids and salts thereof to obtain a hyper-fine cement having a particle size $D_{50}$ of <1 µm, and at least partly separating the non-aqueous solvent and the grinding aid from the hyper-fine cement obtained after milling, a weight ratio of solvent to cement being from 0.05 to 5, and a weight ratio of grinding aid to cement being from 0.01 to 1.5.

13. The process of claim 12, wherein the non-aqueous solvent is separated by at least one of filtration, centrifugation, decantation, and distillation.

14. The process of claim 12, wherein the process further comprises drying moist hyper-fine cement which remains after milling and partial removal of other components to obtain a free-flowing powder.

15. The process of claim 12, wherein the cement is milled in at least one of a ball mill and a rotational ball mill.

16. The process of claim 12, wherein the process further comprises mixing the hyper-fine cement in dry form with water to form a low-viscosity slurry.

17. The process of claim 12, wherein a weight ratio of grinding aid to cement is from 0.1 to 0.2.

18. The process of claim 12, wherein a weight ratio of solvent to cement is from 0.3 to 1.0.

19. The process of claim 17, wherein a weight ratio of solvent to cement is from 0.3 to 1.0.

20. A process for producing a hyper-fine cement, wherein the process comprises wet milling a cement or a cement clinker in at least one of a ball mill and a rotational ball mill in a non-aqueous solvent which comprises isopropanol and in the presence of a grinding aid which comprises triethanolamine to obtain a hyper-fine cement having a particle size $D_{50}$ of <1 μm, and at least partly separating the non-aqueous solvent and the grinding aid from the hyper-fine cement obtained after milling, a weight ratio of solvent to cement being from 0.3 to 1.0, and a weight ratio of grinding aid to cement being from 0.1 to 0.2.

\* \* \* \* \*